United States Patent Office.

WILLIAM BERREY, OF BOSTON, MASSACHUSETTS, ASSIGNOR TO HENRY B. RICHMOND, OF SAME PLACE.

Letters Patent No. 100,844, dated March 15, 1870; reissue No. 4,370, dated May 9, 1871.

IMPROVEMENT IN DETERGENT COMPOUNDS.

The Schedule referred to in these Letters Patent and making part of the same.

I, WILLIAM BERREY, of Boston, in the county of Suffolk and State of Massachusetts, have invented a certain compound, which I term "Improved Electric Washing-Crystal and Wool-Detergent," for the purposes of cleansing wool, woolen fabrics, cotton waste and fabrics; of cleansing and removing the gum or sap from wood preparatory to its being made into pulp and then into paper; of scouring rags and paper "stock" generally, and of bleaching. It may also be used in the manufacture of "sizing" for paper, and as a neutral alkali for soap as used for fulling woolen fabrics.

The nature of my invention consists in mixing water, soda-ash, and sulphate of soda in such proportions and in such a manner as described below.

To make my composition I use about one gallon of water, one and one-half pound soda-ash, and one and one-half pound sulphate of soda, or in that proportion, and boil about two hours. Then I set it in a cool place, and in about four or five days, according to the state of the weather, it crystallizes. The composition when crystallized occupies about one-half the space it did when in a liquid state.

The above quantities, when mixed and crystallized, would make about six pounds weight.

I might use sulphuric acid in place of sulphate of soda were it not for the extra expense of the former. The latter, however, answers the same purpose.

I am of the opinion that my composition does the work claimed for it perfectly, and better than anything now in use, while it is used substantially in the same manner as is common now.

I claim as my invention—

The manufacture or preparation of a compound, which I denominate "improved electric washing-crystal and wool-detergent," of the ingredients, substantially in the proportions, and for the purposes set forth.

WILLIAM BERREY.

Witnesses:

HENRY W. WILLIAMS,
WILLIAM T. RICHMOND.